Patented Aug. 11, 1953

2,648,713

UNITED STATES PATENT OFFICE 2,648,713

SEPARATION OF ISOMERIC AROMATIC COMPOUNDS

Abraham Schneider, Philadelphia, Pa., assignor to Sun Oil Company, Philadelphia, Pa., a corporation of New Jersey No Drawing. Application March 22, 1951, Serial No. 217,060

14 Claims. (Cl. 260—674)

This invention relates to the treatment of isomeric aromatic compounds and is particularly directed to the separation of 1,2-dialkyl benzenes from mixtures including 1,3-dialkyl benzenes.

The importance of 1,2-dialkyl benzenes is well established. For example, o-xylene is important because of the ease with which it may be converted to phthalic anhydride, which is a well known and valuable chemical intermediate. Polyalkyl substituted benzenes usually occur as an admixture of isomers. The components of such mixtures usually boil within temperature ranges so that their separation by fractionation is not practical. For example, the principal natural source of o-xylene is the xylene fraction from petroleum or coal tar processing and as above indicated, separation of o-xylene from mixtures thereof with other xylenes is difficult.

Heretofore described methods for the separation of 1,2-dialkyl aromatics generally involve physical steps which are expensive, require special apparatus and reagents, involve difficult manipulative techniques, and usually achieve only a relatively small yield or an impure product.

An object of the present invention is to provide a rapid, simple, and economical process for the separation of a 1,2-dialkyl benzene from an admixture thereof with one or more isomers including a 1,3-dialkyl benzene. A further object is to provide a process for the separation of a 1,2-dialkyl benzene wherein the apparatus and reagents required are commonly available in refineries and which does not involve difficult manipulative techniques. A further object is to provide for the separation of substantially pure o-xylene in high yields from an admixture containing m-xylene. Other objects appear hereinafter.

It has now been found that by subjecting a mixture of a 1,2-dialkyl benzene with its 1,3-isomer and an alkylating agent to certain alkylating conditions, as hereinafter described, the 1,2-dialkyl benzene is selectively alkylated to form an alkylated product of substantially higher boiling point than the unaffected isomers. The alkylated product is easily separated from the reaction mixture by conventional fractional distillation and is readily dealkylated to produce the 1,2-dialkyl benzene in substantially pure form. A preferred embodiment of the present invention is the separation of o-xylene from an admixture thereof with m-xylenes, and the present invention thus provides a process for the separation of o-xylene from other xylenes by the successive steps of alkylation, distillation, and dealkylation, all of which steps may be performed in apparatus and with reagents commonly available in refineries using simple manipulative techniques. Para-xylene may also be present in the xylene mixture, and remains unalkylated with the m-xylene.

For simplicity, the process of the present invention is described in terms of the separation of o-xylene from an admixture thereof with m-xylene and p-xylene, but the scope is limited only as hereinafter indicated.

In accordance with the present invention, o-xylene may be separated from m-xylene in the presence or absence of p-xylene. The xylene fraction from petroleum or coal tar processing usually consists of a mixture of all of the isomeric xylenes, and hence a preferred embodiment is the separation of o-xylene from an admixture thereof with m-xylene and p-xylene. Ethyl benzene may also be present in such mixtures, and may be removed from the xylenes by methods heretofore known, such as by distillation. However, because of the closeness of the boiling points of ethyl benzene and the xylenes, this separation is difficult, and hence it is preferred to remove ethyl benzene as described in copending application Serial No. 217,059, filed March 22, 1951.

However, it is not essential to the operation of the present process that ethyl benzene be removed in preliminary step, as hereinafter fully described. Also, a substantial advantage of the present invention is that it is unnecessary to make a preliminary separation of p-xylene in order to achieve separation of o-xylene from m-xylene. In order for the present process to be feasible, the mixture should contain at least 2% by volume of o-xylene, and preferably contains from 10 to 50% by volume. The presence of a small amount of hydrocarbons other than the xylenes, such as paraffins or naphthenes, which boil within about the same range does not deleteriously affect the process, since such hydrocarbons do not, in the alkylation reaction, form products boiling sufficiently close to the alkylated o-xylene to prevent the separation thereof. Such hydrocarbons are inert for the purposes of the present process, and up to about 80% by volume may be present, but preferably the quantity thereof is kept below about 10% by volume.

As above stated, it is essential that certain conditions be observed in order to achieve the objects of the present invention. It is of primary importance that the quantity of alkylating material be not substantially above that required to alkylate the o-xylene to form the monoalkyl derivative thereof, i. e., the mole ratio of alkylating material to o-xylene should not be above about 1, and preferably is maintained between 0.5 and 1. If higher ratios are used m-xylene is alkylated so that selectivity is lost, whereas at lower ratios a substantial quantity of o-xylene is not alkylated and remains in the reaction mixture with the unaffected isomers. Accordingly, where an especially pure product is desired, a relatively low mole ratio of alkylating agent to o-xylene should be used, from about 0.5 to 0.75 being preferred. Where a concentrate of o-xylene is desired, say an admixture thereof with a minor amount of m-xylene, higher mole ratios may be used, from about 0.75 to about 1 or as high as 1.1 being suitable. For most purposes a small amount of xylenes other than o-xylene in the product is not objectionable and hence the preferred quantity of alkylating material is the approximate stoichiometric amount required to alkylate the o-xylene to form the monoalkylated derivative thereof.

The alkylating agent to employ is preferably an olefin or a cycloolefin having a tertiary carbon atom, such as isobutylene, diisobutylene, trimethylethylene, 2,4-dimethylpentene-2, 3-methylbutene-2, 4-methylcyclohexene-1, and 1-methylcyclohexene-1. Mixtures of olefins may be used, such as those produced in the preparation of gasoline by the polymerization of low molecular weight olefins. Normal olefins are inoperative in the present process since no selectivity of alkylation is observed with their use. Hydrogen fluoride is the preferred alkylation catalyst to employ with the described olefins, but other catalysts such as phosphoric acid, preferably deposited on a solid carrier, or sulfuric acid, may be employed. Other alkylating materials and catalysts may be employed. For example, alkylating materials such as alkyl halides, preferably alkyl fluorides or chlorides, and alcohols such as secondary and tertiary alcohols containing at least one tertiary carbon atom, preferably tertiary butyl alcohol, may be employed with an appropriate catalyst, for example, a Friedel-Crafts catalyst such as aluminum chloride or hydrogen fluoride, or with a catalyst such as sulfuric acid. The alkylating agent must have at least 1 tertiary carbon atom, and hence has at least 4 carbon atoms per molecule. Preferably the alkylating agent does not have more than 10 carbon atoms per molecule. Alkylation reactions involving these alkylating agents and catalysts are well known, and the conditions heretofore described are suitable in this step of the present process for obtaining alkylating conditions.

Using an olefin, such as isobutylene, with hydrogen fluoride as the catalyst, the alkylation is preferably performed at a temperature of from about —10° C. to 60° C. Higher temperatures cause loss of selectivity probably by isomerizing the tertiary olefin to a primary olefin which alkylates all of the isomers non-selectively. The pressure to employ is advantageously that of the hydrogen fluoride at the temperature employed, although higher pressures may be employed, say from atmospheric to 1,000 p. s. i. The pressure should always be sufficient to maintain the reaction mixture in the liquid phase. The hydrogen fluoride is advantageously the anhydrous hydrogen fluoride of commerce, and may contain up to about 5% moisture. With other alkylating agents and catalysts, the alkylating conditions known to those skilled in the art may be employed.

After alkylation, the hydrocarbons of the reaction mixture are separated from the catalyst, such as by decanting, and are subjected to fractional distillation. Before distillation it is advantageous to neutralize the hydrocarbon layer such as by washing with water, an aqueous alkali solution, or contacting with bauxite. The high boiling product is the alkylated o-xylene which is readily separated by the distillation. The alkylated o-xylene is then subjected to dealkylating conditions selected so that the methyl groups are not affected while the alkyl group having at least 4 carbon atoms is removed. This step is not difficult since methyl groups are relatively difficult to remove from an aromatic ring as compared with alkyl radicals having 4 or more carbon atoms. For dealkylation it is preferred to employ a cracking catalyst, such as compositions of silica-alumina, silica-zirconia, silica-magnesia, Fuller's earth, or attapulgus clay, but other dealkylation catalysts, such as iron, cobalt, vanadium, nickel, or oxides thereof, preferably deposited on a carrier, may be employed. The temperature, pressure, and space velocity will vary according to the catalyst employed. For example, using a synthetic silica-alumina cracking catalyst containing about 80% silica and 20% alumina, a temperature of from 300° C. to 400° C., a space rate (volume of hydrocarbons per volume of catalyst per hour) of from 1 to 4, and atmospheric pressure gives good results.

As above described, the present invention provides a process for the separation of o-xylene from an admixture thereof with m-xylene or an admixture with both m-xylene and p-xylene. By separating o-xylene from an admixture thereof with m-xylene, substantially pure m-xylene, or a concentrate thereof, is a product of the process in the same manner that o-xylene is a product. Where m-xylene or a mixture of m-xylene and p-xylene is the desired product, it is unnecessary to employ the dealkylation step, and the alkylated o-xylene may be used for other purposes.

When ethyl benzene is present in the charge stock, a preferred embodiment of the invention is its prior removal. However, a mixture of ethyl benzene and o-xylene may be separated from m-xylene or both m-xylene and p-xylene by the present process. In this event, it is necessary to employ a sufficient quantity of alkylating material to form the monoalkyl derivative of both the ethyl benzene and o-xylene, and the mole ratio of alkylating material to ethyl benzene and o-xylene should be about 1, but may be varied as above described for o-xylene alone. Thus, the quantity of alkylating agent to employ must be sufficient to alkylate a substantial proportion of the 1,2-dialkyl benzene, whereas the 1,3-dialkyl benzene is substantially unalkylated. If p-xylene is also present in this last-mentioned process, it remains unalkylated with the m-xylene.

The process of the present invention, described in terms of the separation of o-xylene from other xylenes, is applicable to other dialkyl aromatics. For example, o-ethyltoluene may be separated from an admixture thereof with its meta isomer or from an admixture with both the meta and para isomers, and from hemimellitene, pseudocumene, and mesitylene. The process also may be employed to separate 1,2-dialkyl benzenes wherein each alkyl group contains 2 or more carbon atoms, especially where the unalkylated dialkyl benzenes are the desired products, since selective cracking of the substituted group from the alkylated dialkyl benzene may be difficult.

The separation of ethyl benzene from o-xylene, m-xylene, or mixtures thereof wherein p-xylene may be present or absent, is not claimed herein, but is described and claimed in copending application Serial No. 217,059, filed March 22, 1951. The separation of p-xylene from ethyl benzene in the presence or absence of o-xylene, m-xylene, or both, is not herein claimed, but is described and claimed in copending application Serial No. 216,895, filed March 22, 1951.

The following examples illustrate preferred embodiments of the present process:

Example 1

A mixture of isomeric xylenes was prepared by admixing, in parts by volume, 48 parts ethyl benzene, 39 parts o-xylene, 141 parts m-xylene, and 72 parts p-xylene. The mixture was subjected to alkylating conditions in the presence of isobutylene using about 50 volume percent hydrogen fluoride as the catalyst. Since ethyl benzene was present, the quantity of isobutylene employed was sufficient to convert the ethyl benzene and a substantial proportion of the o-xylene, the mole ratio of isobutylene to ethyl benzene and o-xylene being 0.71. The alkylation was conducted at 36–38° C. On completion of the alkylation reaction the acid layer was separated by distillation and the hydrocarbon layer neutralized by washing with a dilute aqueous solution of sodium hydroxide.

The reaction mixture was subjected to distillation. It was found by analysis that 73% of the ethyl benzene and 39% of the o-xylene had been converted to the alkyl derivative and separated by the distillation. The m-xylene was substantially unalkylated, only 3% thereof being converted, and no alkylation of p-xylene was observed.

Example 2

A mixture of isomeric xylenes was prepared by admixing, in parts by volume, 64 parts ethyl benzene, 52 parts o-xylene, 188 parts m-xylene, and 96 parts p-xylene. The mixture was subjected to alkylating conditions in the presence of isobutylene using about 50 volume percent of hydrogen fluoride as the catalyst. The temperature employed was about 13° C., the pressure being that of the hydrogen fluoride at this temperature. The mole ratio of isobutylene to ethyl benzene and o-xylene was 1.06.

The reaction mixture was treated as described in Example 1. Analysis of the unalkylated reaction mixture showed 8.2 parts of ethyl benzene, 24 parts of o-xylene, 148 parts of m-xylene, and an unchanged amount of p-xylene within the limits of experimental error.

The high boiling product, on dealkylation, yields a product having a high concentration of ethyl benzene and o-xylene, whereas the low boiling product has a high concentration of m-xylene and p-xylene. In the alkylation step, the percent of conversion of ethyl benzene and o-xylene was 89 and 54, respectively.

Example 3

Example 1 was repeated except that propylene was substituted for isobutylene. Selective alkylation was not observed, the conversion of ethyl benzene, o-xylene, m-xylene, and p-xylene being respectively 82.1%, 59%, 57.2%, and 59%.

The invention claimed is:

1. Process of separating a 1,2-dialkyl benzene from an admixture thereof with a 1,3-dialkyl benzene which is an isomer of said 1,2-dialkyl benzene which comprises subjecting said admixture in liquid phase to alkylating conditions in contact with an alkylation catalyst and a quantity of an alkylating agent having at least 1 tertiary carbon atom per molecule so that said 1,2-dialkyl benzene is substantially alkylated and said 1,3-dialkyl benzene remains substantially unalkylated, and separating said alkylated 1,2-dialkyl benzene from the reaction mixture.

2. Process of separating a 1,2-dialkyl benzene from an admixture thereof with a 1,3-dialkyl benzene which is an isomer of said 1,2-dialkyl benzene which comprises subjecting said admixture in liquid phase to alkylating conditions in contact with an alkylation catalyst and a quantity of an alkylating agent having at least 1 tertiary carbon atom per molecule so that said 1,2-dialkyl benzene is substantially alkylated and said 1,3 dialkyl benzene remains substantially unalkylated, whereby said 1,2-dialkyl benzene is selectively alkylated, separating said alkylated 1,2-dialkyl benzene from the reaction mixture by fractionation, subjecting said alkylated 1,2-dialkyl benzene to dealkylating conditions, and recovering said 1,2-dialkyl benzene.

3. Process according to claim 2 wherein the mole ratio of said alkylating agent to said 1,2-dialkyl benzene is from about 0.5 to 1.1.

4. Process of separating a 1,2-dialkyl benzene from an admixture thereof with a 1,3-dialkyl benzene which is an isomer of said 1,2-dialkyl benzene which comprises subjecting said admixture in liquid phase to alkylating conditions in contact with isobutylene and hydrogen fluoride, wherein the mole ratio of isobutylene to said 1,2-dialkyl benzene is from 0.5 to 1.1, whereby said 1,2-dialkyl benzene is selectively alkylated with said isobutylene to form butylated 1,2-dialkyl benzene, separating the acid catalyst from the reaction mixture, separating said butylated 1,2-dialkyl benzene from the reaction mixture by fractionation, and subjecting said separated butylated 1,2-dialkyl benzene to dealkylating conditions in the presence of a cracking catalyst whereby the butyl radical is removed, and recovering said 1,2-dialkyl benzene.

5. Process for separating o-xylene from an admixture thereof with m-xylene and p-xylene which comprises subjecting said admixture in liquid phase to alkylating conditions in contact with an alkylation catalyst and an alkylating agent having at least 1 tertiary carbon atom per molecule, wherein the mole ratio of said alkylating agent to said o-xylene is from 0.5 to 1, whereby said o-xylene is selectively alkylated with said alkylating agent, and separating alkylated o-xylene from the reaction mixture.

6. Process of separating o-xylene from an admixture thereof with m-xylene and p-xylene which comprises subjecting said admixture in liquid phase to alkylating conditions in contact with an alkylation catalyst and a quantity of an alkylating agent having at least 1 tertiary carbon atom per molecule so that the mole ratio of said alkylating agent to o-xylene is from about 0.5 to 1, whereby said o-xylene is selectively alkylated with said alkylating agent, separating said alkylated o-xylene from the reaction mixture by fractionation, subjecting said separated alkylated o-xylene to dealkylating conditions in, the presence of a cracking catalyst, and recovering o-xylene.

7. Process according to claim 6 wherein said alkylating agent is an olefin.

8. Process according to claim 6 wherein said alkylating agent is isobutylene.

9. Process according to claim 6 wherein said alkylating agent is diisobutylene.

10. Process according to claim 6 wherein said alkylating agent is 4-methylcyclohexene-1.

11. Process of separating o-xylene from m-xylene which comprises subjecting a mixture thereof in liquid phase to alkylating conditions in contact with an alkylation catalyst and a quantity of an alkylating agent having at least 1 tertiary carbon atom per molecule so that the mole ratio of said alkylating agent to o-xylene is from about 0.5 to 1, whereby said o-xylene is selectively alkylated with said alkylating agent, separating said alkylated o-xylene from the reaction mixture by fractionation, subjecting said separated alkylated o-xylene to dealkylating conditions in the presence of a cracking catalyst, and recovering o-xylene.

12. Process of separating o-xylene from an admixture thereof with m-xylene which comprises subjecting said admixture in liquid phase to alkylating conditions in contact with an alkylation catalyst and an alkylating agent having at least 1 tertiary carbon atom per molecule, wherein the mole ratio of said alkylating agent to said o-xylene is from 0.5 to 1, whereby said o-xylene is alkylated with said alkylating agent, and separating said alkylated o-xylene from the reaction mixture.

13. Process according to claim 12 wherein said separated alkylated o-xylene is subjected to dealkylating conditions, and recovering o-xylene.

14. Process of separating a 1,2-dialkyl benzene from an admixture thereof with a 1,3-dialkyl benzene which is an isomer of said 1,2-dialkyl benzene which comprises subjecting said admixture in liquid phase to alkylating conditions in contact with an alkylation catalyst and an alkylating agent selected from the group consisting of isobutylene, diisobutylene, 4-methylcyclohexene, and tertiary butyl alcohol, wherein the mole ratio of said alkylating agent to said 1,2-dialkyl benzene is from about 0.5 to 1.1, whereby said 1,2-dialkyl benzene is substantially alkylated and said 1,3-dialkyl benzene remains substantially unalkylated, and separating said alkylated 1,2-dialkyl benzene from the reaction mixture.

ABRAHAM SCHNEIDER.

References Cited in the file of this patent

UNITED STATES PATENTS

| Number | Name | Date |
| --- | --- | --- |
| 2,379,368 | Matuszak | June 26, 1945 |
| 2,425,858 | Beach | Aug. 19, 1947 |

OTHER REFERENCES

Nightingale et al., Jour. Amer. Chem. Soc., vol. 64, pp. 1662-5 (July 1942).

Nightingale et al., Jour. Amer. Chem. Soc., vol. 66, pp. 154-5 (January 1944).